(12) United States Patent
Mine et al.

(10) Patent No.: US 6,910,810 B2
(45) Date of Patent: Jun. 28, 2005

(54) OPTICAL PART FOR TWO-WAY OPTICAL COMMUNICATION

(75) Inventors: Keiji Mine, Osaka (JP); Hiroshi Nakagawa, Kyoto (JP); Takeshi Isoda, Osaka (JP)

(73) Assignee: Hosiden Corporation, Osaka (JP)

( * ) Notice: Subject to any disclaimer, the term of this patent is extended or adjusted under 35 U.S.C. 154(b) by 60 days.

(21) Appl. No.: 10/411,778

(22) Filed: Apr. 11, 2003

(65) Prior Publication Data

US 2003/0198444 A1 Oct. 23, 2003

(30) Foreign Application Priority Data

Apr. 17, 2002 (JP) ......................................... 2002-114596

(51) Int. Cl.[7] ................................................ G02B 6/36
(52) U.S. Cl. .............................. 385/89; 385/31; 385/36; 385/88
(58) Field of Search .............................. 385/31, 36, 88, 385/89

(56) References Cited

U.S. PATENT DOCUMENTS

| | | | |
|---|---|---|---|
| 5,771,322 A | * | 6/1998 | Matsumoto et al. .......... 385/31 |
| 6,351,584 B1 | * | 2/2002 | Horie et al. ................... 385/31 |
| 6,438,289 B1 | * | 8/2002 | Serizawa ...................... 385/31 |
| 6,626,584 B2 | * | 9/2003 | Fujita et al. .................. 385/88 |
| 6,760,517 B2 | * | 7/2004 | Mine et al. ................... 385/36 |

* cited by examiner

*Primary Examiner*—John R. Lee
*Assistant Examiner*—Paul M. Gurzo
(74) *Attorney, Agent, or Firm*—David N. Lathrop, Esq.; Gallagher & Lathrop

(57) ABSTRACT

An optical guide 43 is partly buried in a lens 43 on the diameter of its aperture, the lens 43 converging received light incident from the end face of an optical fiber onto a light receiving element 15 and the optical conductor 33 having a refractive index larger than that of the lens 43. The optical guide 33 is composed of a buried portion 33-1 and an extending portion 33-2, and transmitting light 22 incident on the optical guide 33 from the end face 33c of the extending portion 33-2 is reflected by a reflecting surface 33a and launched into the optical fiber. The transmitting light 22 is guided by the optical guide 33 to the end face of the optical fiber without leakage to the receiving-side portion.

8 Claims, 10 Drawing Sheets

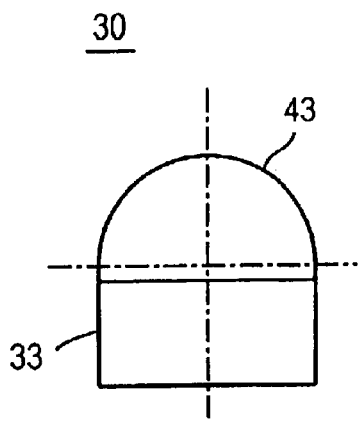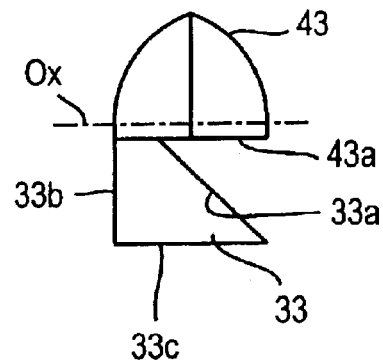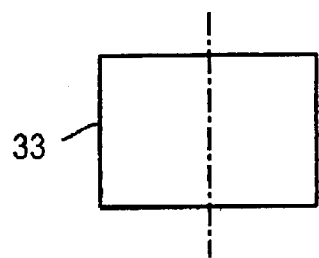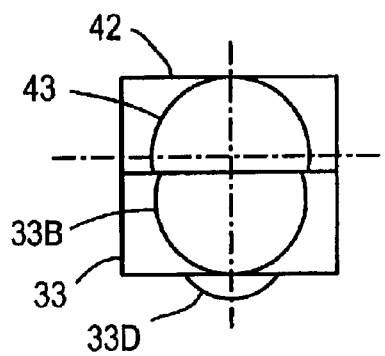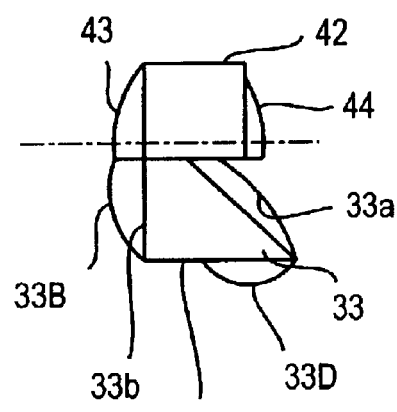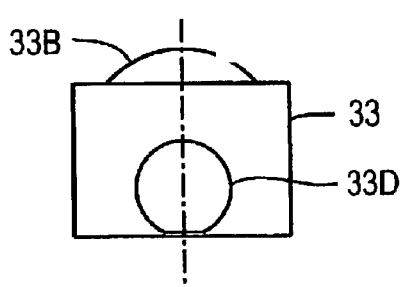

US 6,910,810 B2

OPTICAL PART FOR TWO-WAY OPTICAL COMMUNICATION

BACKGROUND OF THE INVENTION

The present invention relates to a optical part for two-way optical communications that transmits and receives lightwave signals over a single optical fiber and, more particularly, to an optical part which is disposed opposite either end face of an optical fiber to guide received light from the optical fiber to a light receiving element and launch transmitting light from a light emitting element into the optical fiber end face.

FIG. 16 schematically shows a prior art example of an optical part of this kind, together with an optical fiber, a light emitting element and a light receiving element. In this example the optical part is made up of a prism 11 and two convergent lenses 12 and 13, through which lightwave signals are transmitted and received.

The prism 11 is right triangular in section, and an optical fiber 14 is disposed with its end face opposite a first one 11a of two surfaces of the prism 11 forming therebetween its right angle, and a light receiving element 15 is disposed opposite the second surface 11b of the prism 11 with the lens 12 interposed between them. Outside a third surface 11c of the prism 11, which is its oblique side, there is disposed a light emitting element 16 behind the lens 13.

The light receiving element 15 and the light emitting element 16 are each sealed by transparent resin on a lead frame. In FIG. 16, reference numeral 17 denotes the lead frame and 18 the sealing resin. The light emitting element 16 is such as a laser diode (LD) or light emitting diode (LED), and the light receiving element 15 is, for example, a photodiode (PD).

With such an arrangement as mentioned above, received light 21 exiting from the end face of the optical fiber 14 enters the prism 11 through the surface 11a, then it is reflected by the surface 11c to the side surface 11b and focused through the lens 12 onto the light receiving element 15. On the other hand, transmitting light 22 emitted from the light emitting element 16 is converged by the lens 13, then enters the prism 11 through the surface 11c and travels to the surface 11a, through which it is launched into the end face of the optical fiber 14.

As described above, according to the conventional arrangement shown in FIG. 16, the light path is defined for transmission or reflection, depending on whether the third surface (oblique side) 11c of the prism 11 transmits therethrough or reflects the light incident thereon; in FIG. 16 the hatched portion is shared between transmission and reception.

Accordingly, the prior art suffers from a crosstalk phenomenon that stray light in the prism 11 or the transmitting light 22 is reflected by the first surface (an aperture) 11a of the prism 11 and the end face of the optical fiber 14 to the receiving side as shown in FIG. 17 and impinges on the light receiving element 15. From the viewpoint of performance, the magnitude of crosstalk becomes issue Further, since the two lenses 12 and 13 are used with a view to providing increased coupling efficiency, the prior art example is large in the component count and hence is expensive, bulky and difficult of miniaturization.

SUMMARY OF THE INVENTION

It is therefore an object of the present invention to provide an optical part for two-way optical communications which suppresses crosstalk and is highly efficient, small and less expensive.

According to the present invention, there is provided an optical part for use in two-way optical communication which performs transmission and reception over a single optical fiber, said optical part comprising:

converging means for converging received light from said optical fiber onto a light receiving element; and optical guide means disposed adjacent said converging means, for launching transmitting light from a light emitting element into said optical fiber;

wherein a region dedicated for emitting said transmitting light from said optical guide means to said optical fiber is formed adjacent a region of said converging means on which said received light incident from said optical fiber impinges.

BRIEF DESCRIPTION OF THE DRAWINGS

FIG. 8A is a front view of another embodiment of the optical part according to the present invention;

FIG. 8B is its side view;

FIG. 8C is its bottom view;

FIG. 9A is a front view of another embodiment of the optical part according to the present invention;

FIG. 9B is its side view;

FIG. 9C is its bottom view;

DETAILED DESCRIPTION OF THE PREFERRED EMBODIMENTS

Figure 1A:
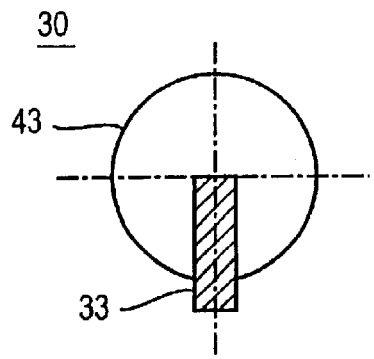
FIG. 1A is a front view illustrating an embodiment of the optical part according to the present invention.
Figure 1B:
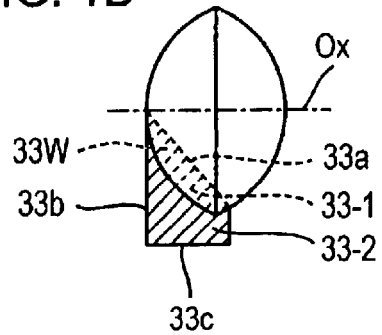
FIG. 1B is its side view.
Figure 1C:
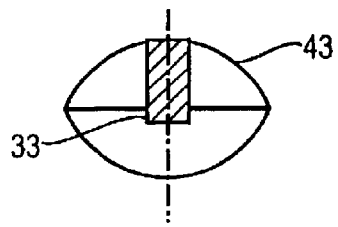
FIG. 1C is its bottom view.

FIGS. 1A through 1C schematically illustrate an embodiment of the present invention, in which an optical part 30, which is used for two-way optical communications to perform transmission and reception over a single optical fiber, comprises a lens 43 through which received light exiting from the optical fiber end face is focused or converged onto a light receiving element and an optical guide 33 (indicated by hatching) which has a refractive index larger than that of the lens 43 and has its one end portion buried in the lens 43.

The optical guide 33 is, in this embodiment, substantially a trapezoidal member having, for instance, an about 45°-angled portion 33W. The optical guide 33 is located on the diameter of the aperture of the lens 43 disposed opposite the optical fiber end face. The optical guide 33 is composed of a buried portion 33-1 including the oblique side edge 33a and its marginal portion of the angled portion 33W which are buried in the lens 43 and a portion 33-2 extending radially-outwardly of the lens 43. In this example the optical guide 33 is disposed on one radius of the lens 43 with the tip of the angled portion 33W held near the optical axis Ox of the lens 43.

The sloping face of the buried portion 33-1 of the optical guide 33 is inclined at about 45° or less to the optical axis Ox of the lens 43 to form a reflecting surface 33a, and the extending portion 33-2 extends from the buried portion 33-1 radially-outwardly of the lens 43. For total reflection of incident light off the reflecting surface 33a, the angle of incidence thereon is so chosen as to be smaller than a critical angle which depends on the refractive indexes of the lens 43 and the optical guide 33.

The optical guide 33 in this example is trapezoidal in its entirety as depicted in FIG. 1. The surface (aperture) 33b of the extending portion 33-2 opposite the optical fiber end face is located in a plane perpendicular to the optical axis Ox of the lens 43 and containing the vertex of the extending portion 33-2 on the optical axis Ox of the lens 43. The end face 33c of the extending portion 33-2 is held parallel to the optical axis Ox of the lens 43.

The lens 43 and the optical guide 33 are made of a low-cost resin of high transparency (transmittance) (such as acryl, polycarbonate, amorphous polyolefine). In this case, the lens 43 and the optical guide 33 can also be molded in one piece by two-color molding, but they may also be molded in one piece of ordinary optical glass.

Figure 2A:
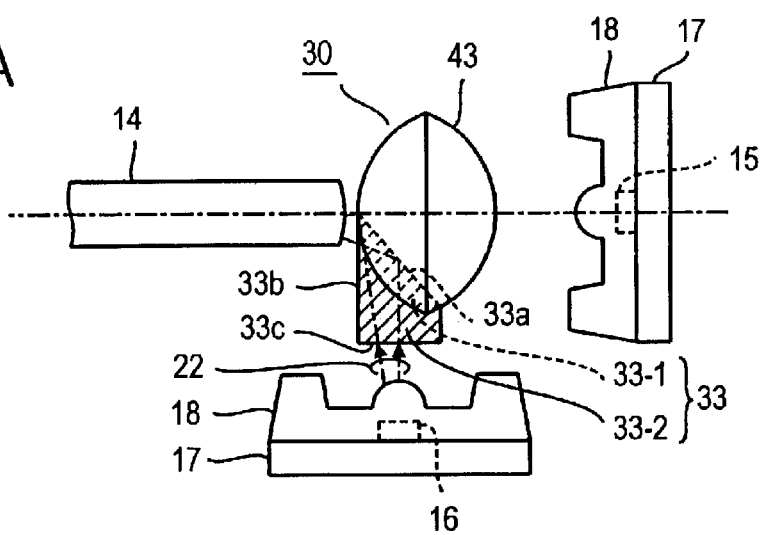
FIG. 2A is a diagram schematically showing how light is transmitted through the optical part of FIG. 1.
Figure 2B:
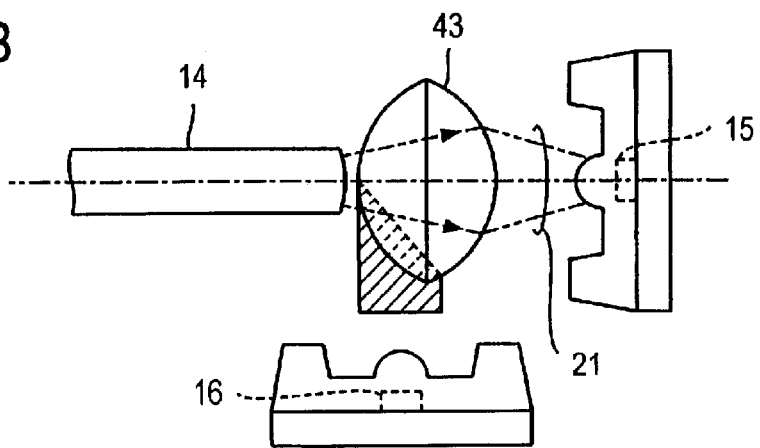
FIG. 2B is a diagram schematically showing how light is received through the optical part of FIG. 1.

FIGS. 2A and 2B show how light is transmitted and received through the optical part 30. The light emitting element 16 is disposed opposite the extended end face 33c of the optical guide 33, that is, in this example the light emitting element 16 and the light receiving element 15 are disposed perpendicularly with respect to each other. The optical fiber 14 and the lens 43 are axially aligned.

As shown in FIG. 2, the transmitting light 22 emitted from the light emitting element 16 enters the optical guide 33 through its end face 33c and is reflected by the reflecting surface 33a to the surface (aperture) 33b and thence launched into the end face of the optical fiber 14. In order that the reflecting surface 33a may preferably achieve total reflection, it is formed of a material of a refractive index larger than that of the lens 43 and its angle of inclination with respect to the optical axis Ox is set to 45° or less.

On the other hand, the received light 12 exiting from the end face of the optical fiber 14 is focused or converged through the lens 43 onto the light receiving element 15 as depicted in FIG. 2B. As is the case with the prior art example of FIG. 16, the light emitting element 16 and the light receiving element 15 are, in this example, sealed on the lead frames 17 by use of the sealing resin 18.

Figure 3:
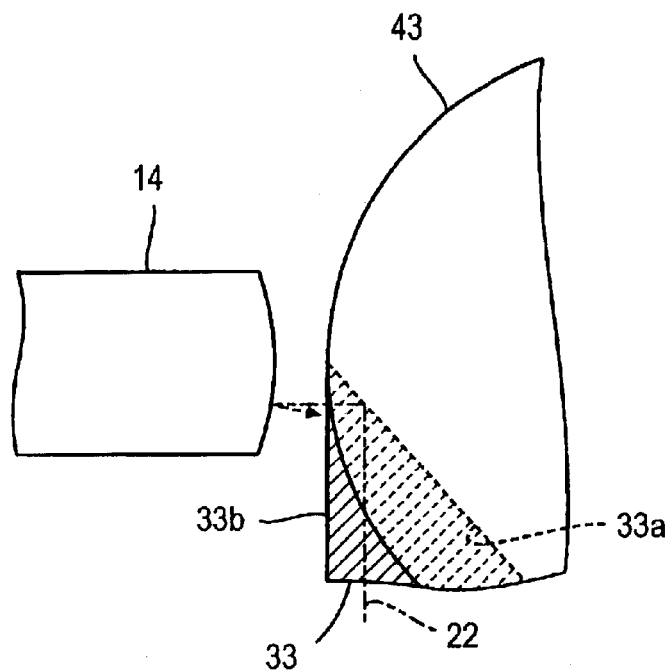
FIG. 3 is a diagram explanatory of the direction in which transmitting light emitted through the aperture of an optical guide is reflected off the optical fiber end face in the optical part of FIG. 1.
Figure 16:
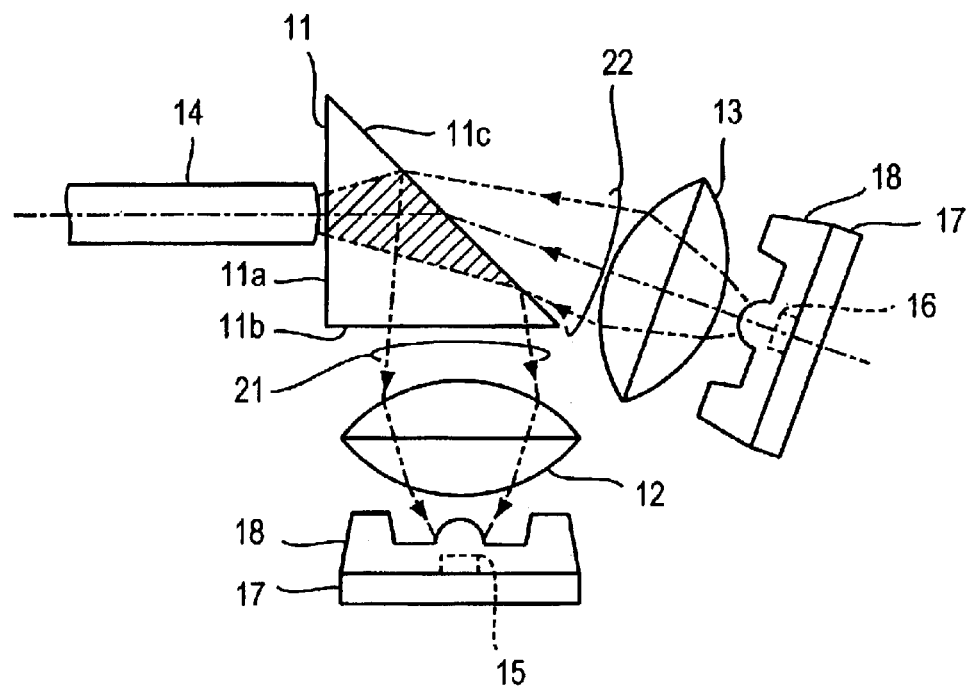
FIG. 16 is a diagram schematically showing how light is transmitted and received through a conventional optical part (composed of a prism and two lenses)
Figure 17:
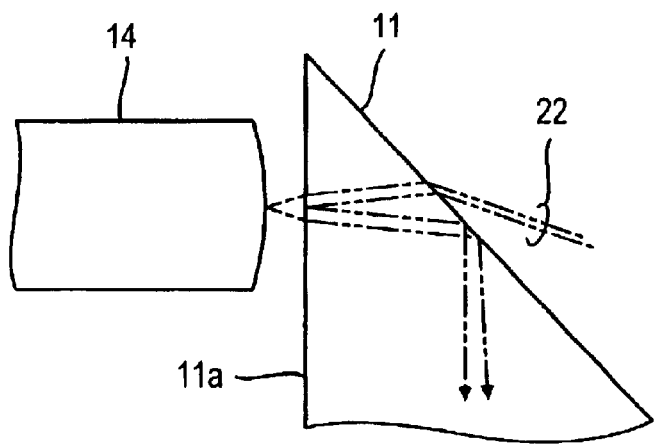
FIG. 17 is a diagram showing how reflected light of transmitting light leaks to the receiving side in the optical part of FIG. 16.

The optical part 30 of the above configuration guides the transmitting light 22 by the optical guide 33 to the end face of the optical fiber, that is, the optical guide 33 has no such a transmission/reception sharing portion as does the FIG. 16 prior art example, but instead the optical guide 33 constitutes an optical path dedicated for transmission. And the transmitting light 22 reflected by the end face of the optical fiber 14 or aperture 33b of the optical guide 33 goes back only in the direction of the optical guide 33 as shown in FIG. 3.

Accordingly, the optical part 30 ensures emitting of the transmitting light 22 without leaking reflected light or stray light to the receiving side, and hence permits sharp reduction of crosstalk that the transmitting light 22 strikes on the light receiving element 15.

Further, the provision of the optical path dedicated for transmission allows reduction of the aperture area at the transmitting side-this permits widening the aperture at the receiving side and hence providing increased receiving efficiency accordingly.

Besides, since the transmitting light 22 is focused by reducing the aperture area at the transmitting side to a very small spot size for launch into the optical fiber 14, the effective aperture areas for transmission and reception are insusceptible to eccentricity of the optical fiber 14, allowing suppression of variations in the quantities of transmitting light and received light.

In contrast to the prior art example of FIG. 16 which is a tri-component part made up of the prism 11 and the two lenses 12 and 13 to form a diverging and a converging part separately, the optical part 30 of this embodiment is a single structural member, and hence it can be miniaturized and is less expensive accordingly.

Figure 4A:
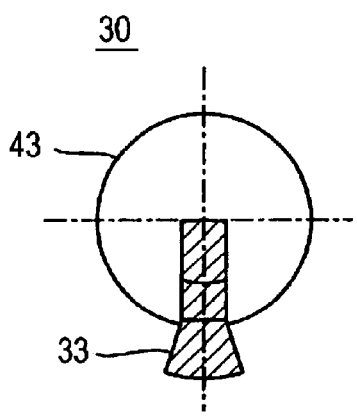
FIG. 4A is a front view of another embodiment of the optical part according to the present invention.
Figure 4B:
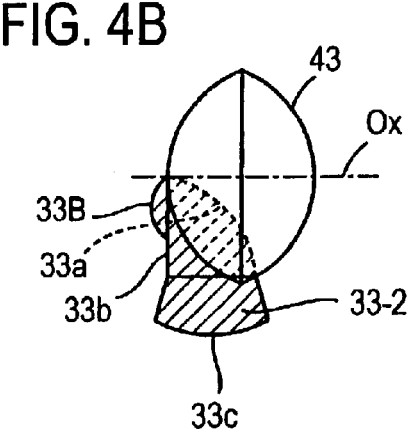
FIG. 4B is its side view.
Figure 4C:
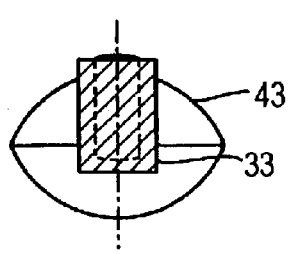
FIG. 4C is its bottom view.

FIGS. 4A through 4C schematically illustrate another embodiment of the optical part 30 which alters the shape of the optical guide 33 with a view to further improving performance. In this embodiment the reflecting surface 33a of the optical guide 33 is concavely curved; the end face 33c of the optical guide 33 disposed opposite the light emitting element 16 is convexly curved; a convergent lens 33B is integrally formed on the aperture 33b disposed opposite the end face of the optical fiber 14; and that part of the extending portion 33-2 which extends radially-outwardly of the lens 43 is gradually broadened toward its end face 33c.

With such a configuration of the optical guide 33, the beam of transmitting light incident on the end face 33c is reflected off the concavely curved reflecting surface 33a and focused through the convergent lens 43 to a spot size sufficiently smaller than the numerical number (NA) of the optical fiber 14 (see FIG. 2A) for launch into its end face.

While in the above the light emitting element 16 and the light receiving element 15 are disposed perpendicularly with respect to each other, they may also be placed in opposing relation by use of such an optical part as described below.

Figure 5A:
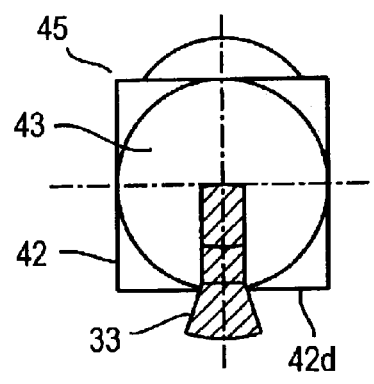
FIG. 5A is a front view of another embodiment of the optical part according to the present invention.
Figure 5B:
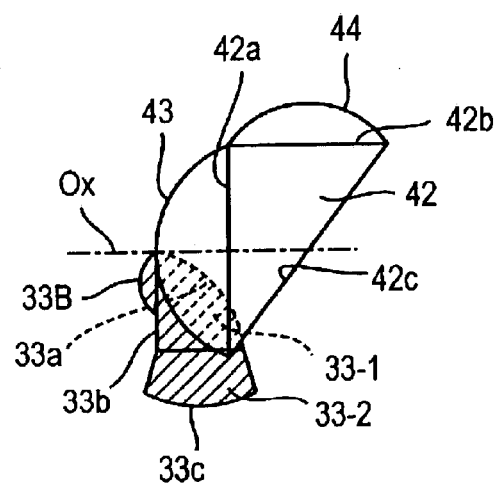
FIG. 5B is its side view.
Figure 5C:
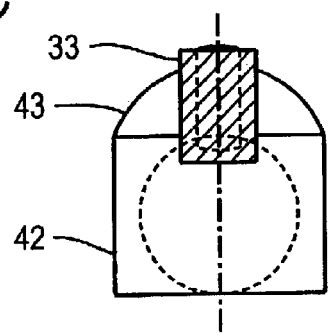
FIG. 5C is its bottom view.

FIGS. 5A through 5C depict the construction of the optical part 30 which enables the light emitting element 16 and the light receiving element 15 to be disposed opposite each other. In this example a lens 43, a prism 42 and a convergent lens 44 are integrated into a compound optical element 45. The optical guide 33 disposed with its one end portion buried in the lens 43.

The prism 42 is used to guide the received light 21 from the optical fiber 14 (see FIG. 6) in a direction different from the direction of incidence thereon, that is, in a direction substantially perpendicular to the optical axis of the incident light and opposite from the light emitting element 16. In this example the prism 42 is right triangular in section and the optical fiber 14 is disposed with its end face opposite a first one 42a of two surfaces of the prism 42 forming therebetween its right angle, and a light receiving element 15 is disposed opposite the second surface 42b of the prism 42. The first and second convergent lenses 43 and 44 are formed integrally with the first and second surfaces 42a and 42b, respectively. A sloping third surface 42c of the prism 42 forms a reflecting surface on the inside thereof.

The optical guide 33 has, in this example, the same configuration as that of the optical guide 33 shown in FIG. 4 and is located on one radius of the aperture of the convergent lens 43 opposite the optical fiber end face so that the optical guide 33 extends from the center of the lens 43 and projects outwardly of an edge 42d of the prism 42 where its surfaces 42a and 42c meet.

The optical guide 33 has a refractive index larger than that of the receiving compound optical element 45 and its extending portion 33-2 extends from the buried portion 33-1 and protrudes beyond the edge 42d of the prism 42. The reflecting surface 33a is inclined with respect to the optical axis of the convergent lens 43.

Figure 6A:
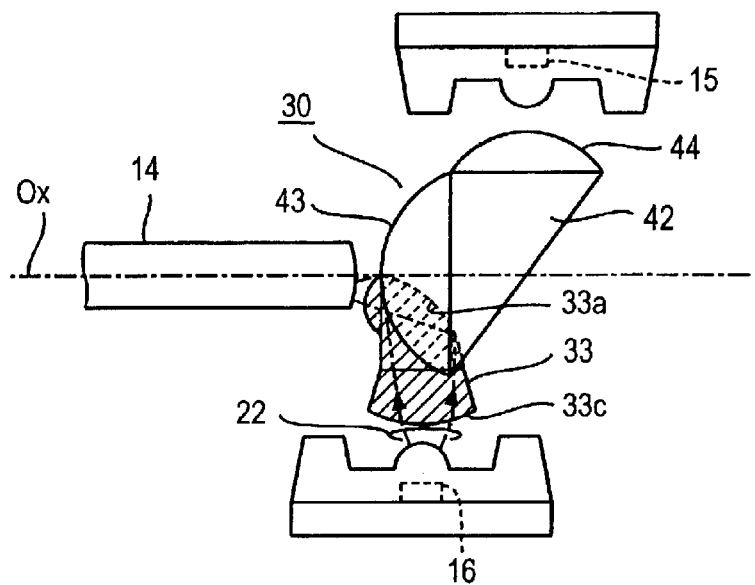
FIG. 6A is a diagram schematically showing how light is transmitted through the optical part of FIG. 5.
Figure 6B:
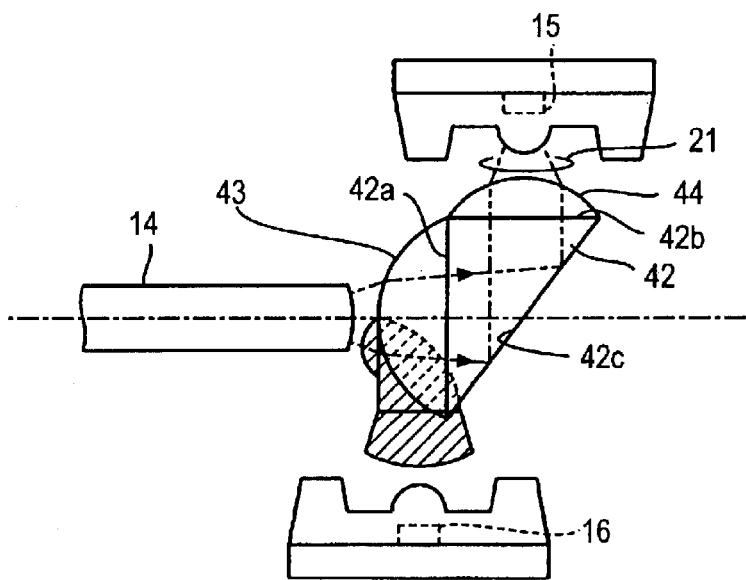
FIG. 6B is a diagram schematically showing how light is received through the optical part of FIG. 5.

FIGS. 6A and 6B show how light is transmitted and received through the optical part 30 of this embodiment. The light receiving element 15 is disposed opposite the convergent lens 44 formed integrally on the surface 42b of the prism 42, that is, the light receiving element 15 is located in parallel but opposing relation to the light emitting element 16 disposed opposite the extended end face 33c of the optical guide 33. The optical fiber 14 and the convergent lens 43 are axially aligned with each other.

The transmitting light 22 emitted from the light emitting element 16 and into the optical guide 33 is reflected by the concavely curved reflecting surface 33a to the end face of the optical fiber 14 as shown in FIG. 6A.

On the other hand, the received light 21 exiting from the end face of the optical fiber 14 is converged by the convergent lens 43 and launched into the prism 42 through the surface (aperture) 42a, and the incident light is reflected off the surface 42c to the surface 42b and focused through the convergent lens 44 onto the light receiving element 15 as depicted in FIG. 6B.

As described above, in the embodiment shown in FIGS. 5 and 6, the optical part 30 reflects the received light for incidence on the light receiving element 15. This functional configuration enables the light emitting element 16 and the light receiving element 15 to be disposed in opposing relation. Incidentally, the optical part 30 of this embodiment is also made of the same material as that for the optical part 30 of FIG. 2.

Figure 7:
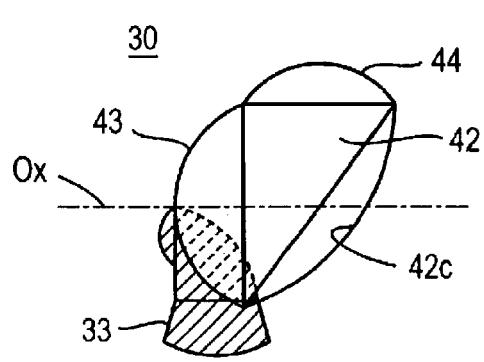
FIG. 7 is a front view of another embodiment of the optical part according to the present invention.

FIG. 7 schematically illustrates a modified form of the optical part 30 of FIG. 5, in which the sloping surface 42c of the prism 42 is concavely curved. This structure further stabilizes focusing of the received light 21. The concavity 42c in the prism 42 can be obtained by forming a convex lens on the outside of the slope of the prism 42.

In the optical parts 30 described above with reference to FIGS. 1 through 7, the optical guide 33 is placed on one radius of the lens (43) aperture, that is, the vertex of the optical guide 33 on the side of the optical axis of the convergent lens 43 is aligned with the center thereof, but the vertex of the optical guide 33 may also be located somewhat forwardly or rearwardly of the center of the lens 43.

While in the above the optical guide is partly buried in the received light path (receiving part) to form a light path dedicated for transmission, the receiving part (which forms the received light path) and the transmitting part (which forms the transmitting light path) may be integrated into an optical part for two-way optical communications.

FIGS. 8A through 8C schematically illustrate an embodiment of such an optical part. In this embodiment the optical part 30 is an integral structure of a hemispherical lens half 43 retaining the optical axis Ox and the optical guide 33 formed by a prism.

The optical guide 33 is a trapezoidal member formed by cutting out one acute angled portion of a right-triangularly-sectioned prism in parallel to the opposite side, and the trapezoidal optical guide has its cut-out portion integrally joined to the flat portion 43a of the lens half 43.

In the optical part 30 of the above configuration, the lens half 43 provides a received light path in which the received light exiting from the optical fiber end face is focused through the lens half 43 onto the light receiving element, and the prism forming the optical guide 33 provides the transmitting light path.

The light emitting element is disposed opposite the first surface 33c of the optical guide 33 on the side opposite from the cut-out portion which is joined to the lens half 43, and the second surface 33b perpendicular to the surface 33c is opposed to the optical fiber end face in side-by-side relation to the lens half 43; that is, the second surface 33b forms the aperture. The third surface (sloping surface) 33a functions as a reflecting surface.

The transmitting light entering the optical guide 33 through the surface 33c is reflected by the sloping surface 33a into the optical fiber end face through the surface 33b. The surface 33a is inclined at such an angle as to achieve total reflection of the transmitting light.

The optical part 30 of this embodiment is also made of a low-cost resin of high transparency (transmittance), such as acryl, polycarbonate, amorphous polyolefine.

FIGS. 9A through 9C schematically illustrate a modified form of the optical part 30 of FIG. 8, which alters the shape of the receiving-side portion and aims to improve the performance of the transmitting side. In this example, on the part of the receiving side the convergent lenses 43 and 44 are integrally formed with opposite sides of a box-shaped block 42 with the optical axes of the lenses 43 and 44 held in alignment. On the part of the transmitting side, convergent lenses 33B and 33D are integrally formed with the surfaces 33c and 33b of the prismatic optical guide 33, respectively, and the reflecting surface 33a is concavely curved.

By integrally forming the convergent lenses 33B and 33D with the prismatic optical guide 33 and concavely curving the reflecting surface as described above, it is possible to launch the transmitting light into the optical fiber perpendicularly to its end face while focusing the beam to a spot size sufficiently smaller than the numerical aperture of the optical fiber.

Figure 10A:
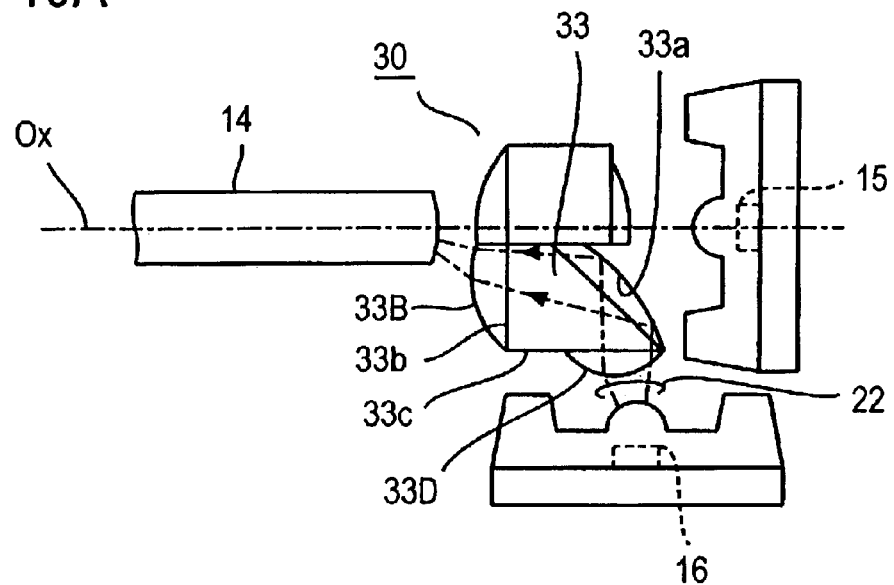
FIG. 10A is a diagram schematically showing how light is transmitted through the optical part of FIG. 9.
Figure 10B:
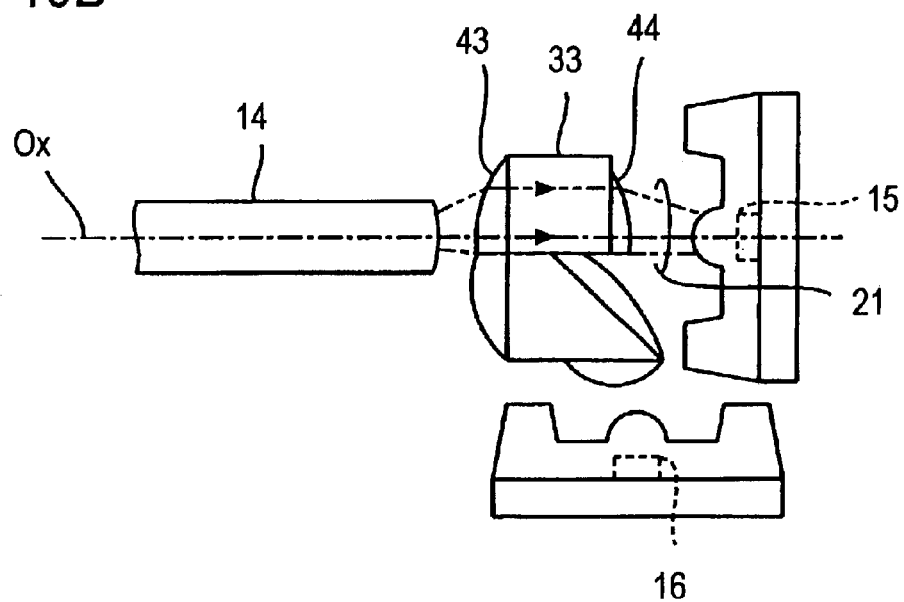
FIG. 10B is a diagram schematically showing how light is received through the optical part of FIG. 9.

FIGS. 10A and 10B schematically illustrate how light is transmitted and received through the optical part 30 shown in FIG. 9. The light emitting element 16 is disposed opposite the convergent lens 33B protruding from the surface 33c of the prismatic optical guide 33, whereas the light receiving element 15 is located on the optical axis Ox common to the convergent lenses 43 and 44. Incidentally, the optical axis Ox of the optical fiber 14 is aligned with th optical axes of the convergent lenses 43 and 44.

As shown in FIG. 10A, the transmitting light 22 emitted from the light emitting element 16 is converged by the convergent lens 33D, then launched into the prismatic optical guide 33, then reflected by the concavely curved reflecting surface 33a to the surface 33b, then converged by the convergent lens 33B, and launched into the optical fiber 14.

On the other hand, the received light 21 exiting from the end face of the optical fiber 14 is focused through the convergent lenses 43 and 44 on the both sides of the block 42 onto the light receiving element 15.

With the optical part 30 of such a configuration as depicted in FIG. 9, the transmitting light path and the received light path are basically separated from each other, and the frequency of occurrence of crosstalk which is caused by the reflection of the transmitting light 22 off the end face of the optical fiber 14 or aperture of the convergent lens 33B or stray light is somewhat higher than in the case of, for example, the optical part 30 shown in FIG. 4 but lower than in the prior art example.

In this example, the received light path (receiving side) and the transmitting light path (transmitting side) are molded in one-piece of the same material—this permits reduction of manufacturing costs as compared with those of the optical parts of the afore-mentioned structure having the optical guide partly buried in the lens whose refractive index different from that of the optical guide.

Figure 11A:
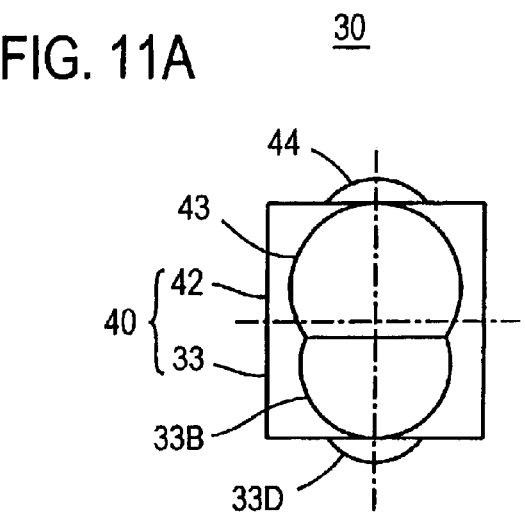
FIG. 11A is a front view of another embodiment of the optical part according to the present invention.
Figure 11B:
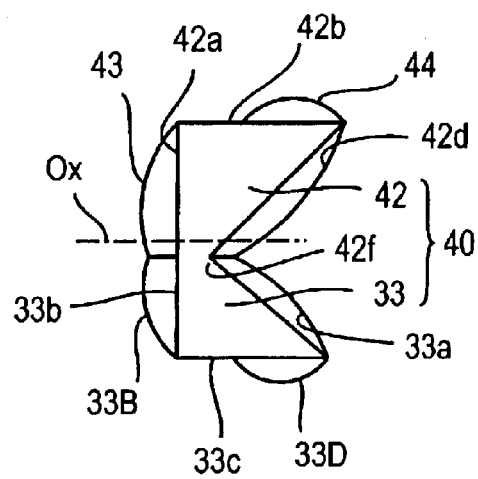
FIG. 11B is its side view.
Figure 11C:
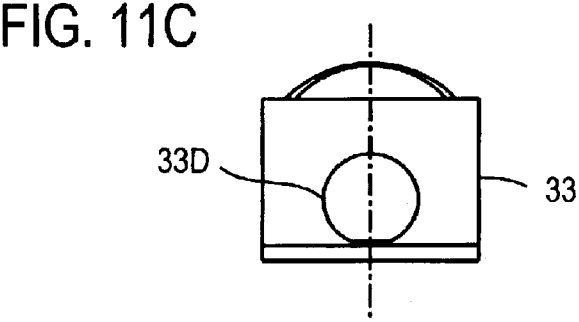
FIG. 11C is its bottom view.

FIGS. 11A to 11C schematically illustrate a modified form of the optical part 30 of the type that the receiving-side portion and the transmitting-side portion are molded in one-piece of the same material. The optical part of this example is designed so that the light emitting element 16 and the light receiving element 15 are disposed opposite each other. To this end, the prismatic optical guide 33 and a prism 42 for the receiving light path are integrated into a prism 40 of pentagonal cross section.

A first surface 42a of the prism 42 and its adjoining second surface 42b are perpendicular to each other, and the surface 42a and a surface 33b of the prismatic optical guide 33 are flush with each other, and the surfaces 33b and 33c of the optical guide 33 are perpendicular to each other. The pentagonally-sectioned prism 40 is profiled with a concavity defined by the remaining two surfaces 42d and 33a which form acute angles with the surfaces 42b and 33c, respectively. A corner or angled portion 42f formed at the intersection of the surfaces 42d and 33a is close to the surface 42a as depicted in FIG. 11B.

The prism 40 forms the receiving light path by a portion above the corner 42f in FIG. 11B and the transmitting light path by a portion below the corner 42f. The light beam incident from the optical fiber strikes on both of the lenses 43 and 44 about the optical axis Ox. The optical axis Ox represents the position of the optical axis of the optical fiber (not shown). The optical axis Ox is shifted further inside the prism 42 than the corner 42f. Accordingly, the surface area of the receiving-side lens 43 which is irradiated with the incident light from the optical fiber is made larger than the surface area of the transmitting-side lens 33B which is irradiated with the incident light—this is intended to reduce the loss of the incident light. By determining the positional relationship of the optical axis Ox to the lenses 33B and 43 so that the incident light beam impinges on the two lenses at the same time as described above, the transmitting light from the light emitting element can also be launched into the optical fiber through the lens 33B without leakage of the transmitting light to the light receiving element side. Further, the light incident on the lens 33B from the optical fiber in parallel with the optical axis Ox is emitted through the prism 33 to the light emitting element side and becomes a loss, but no crosstalk will occur.

The prism 40 of the above configuration has the two convergent lenses 43 and 33B formed integrally with the surface 42a opposite the optical fiber end face. The convergent lenses 43 and 33B are partly cut out and are joined together through their cut-out portions. Further, the condense lenses 44 and 33D are also formed integrally with the surfaces 42b and 33c, respectively, and the interior surfaces 42d and 33a serving as reflecting surfaces are concavely curved.

Figure 12:
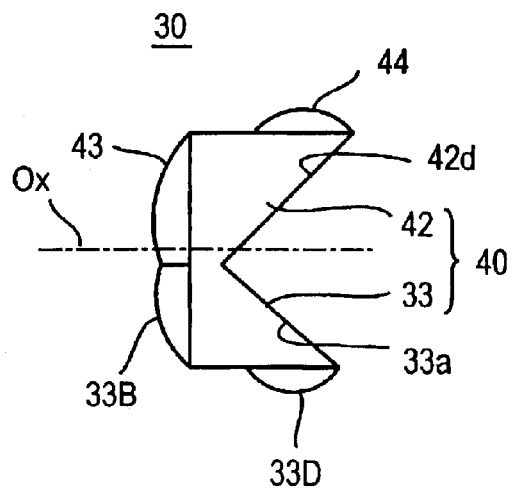
FIG. 12 is a front view of another embodiment of the optical part according to the present invention.

While the optical part 30 of this embodiment has the above construction in which the prism 40 of pentagonal section has integrally formed therewith the convergent lenses 43, 44, 33B and 33D and the interior surfaces 42d and 33a are concavely curved, the interior surfaces 42d and 33a may be made flat as shown in FIG. 12, for example.

Figure 13A:
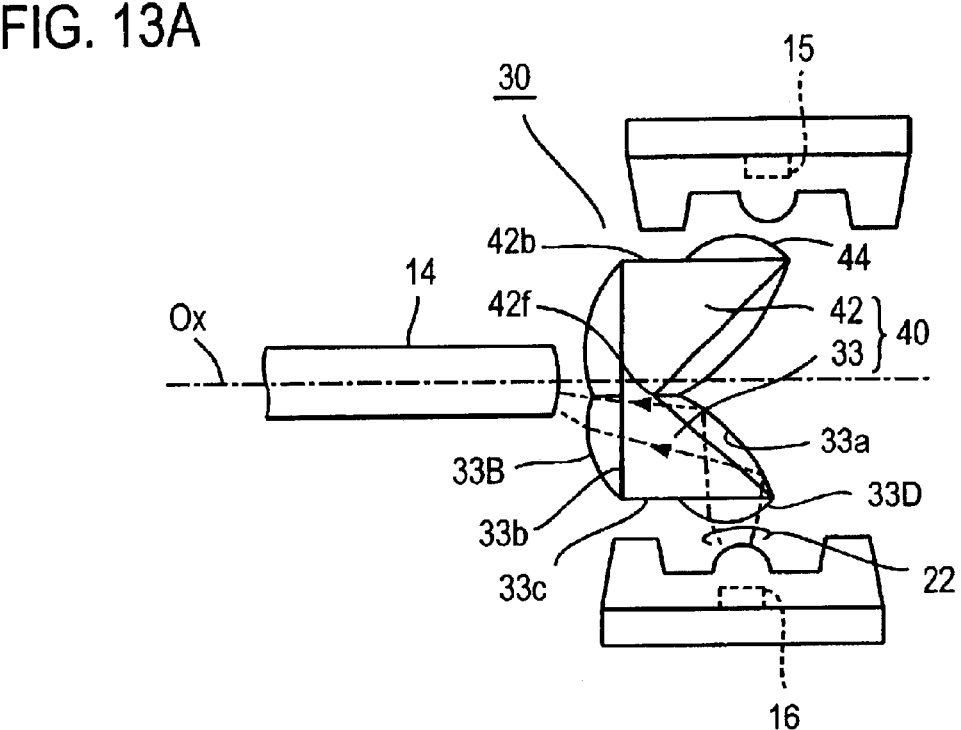
FIG. 13A is a diagram schematically showing how light is transmitted through the optical part of FIG. 11.
Figure 13B:
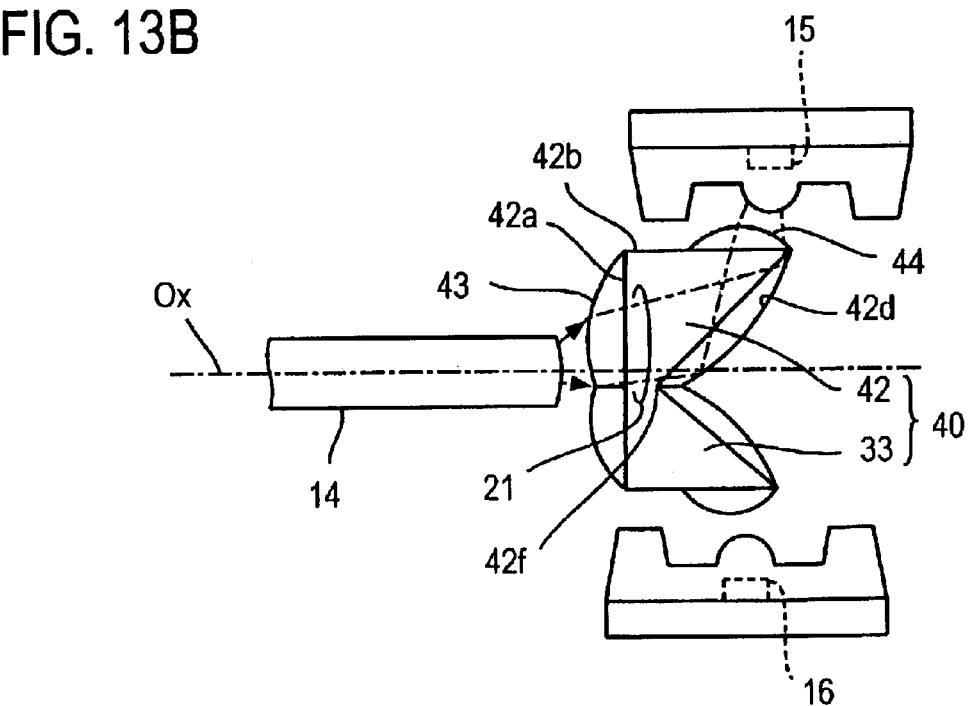
FIG. 13B is a diagram schematically showing how light is received through the optical part of FIG. 11.

FIGS. 13A and 13B schematically show how light is transmitted and received through the optical part 30 of FIG. 11. The light emitting element 16 is placed opposite the convergent lens 33D protrusively provided on the surface 33c of the prism 40 and the light receiving element 15 is placed opposite the convergent lens 44 protrusively provided on the surface 42b of the prism 40; thus, the light emitting element 16 and the light receiving element 15 are located in parallel and opposing relation. The optical axis Ox of the optical fiber 14 is aligned with the optical axis of the receiving-side convergent lens 43 on the surface 42a of the prism 40.

As shown in FIG. 13A, the transmitting light 22 emitted from the light emitting element 16 enters the prism 40 through the convergent lens 33D, then reflects off the concavely curved reflecting surface 33a to the surface 33b, and impinges on the end face of the optical fiber 14 through the convergent lens 33B.

On the other hand, as shown in FIG. 13B, the received light emitted from the end face of the optical fiber is incident on the prism 40 through the convergent lens 43, then reflected by the concavely curved reflecting surface 42d to the surface 42b, and focused through the convergent lens 44 onto the light receiving element 15.

As described above, the optical part 30 of this embodiment utilizes, as reflecting surfaces, the sloping surfaces 42d and 33a which defines the concavity in the prism 40 to form the corner or angles portion 42f, by which it is possible to isolate the transmitting light path and the received light path and to place the light emitting element 16 and the light receiving element 15 in opposing relation.

Figure 14A:
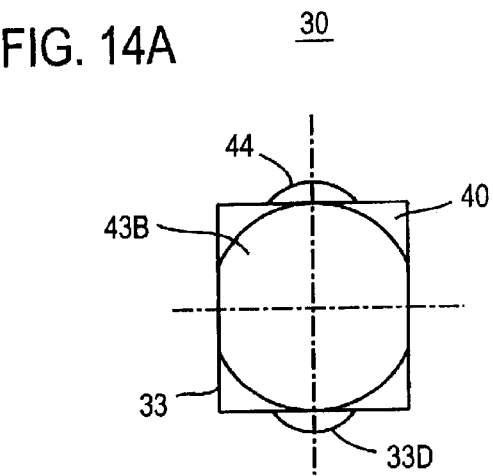
FIG. 14A is a front view of still another embodiment of the optical part according to the present invention.
Figure 14B:
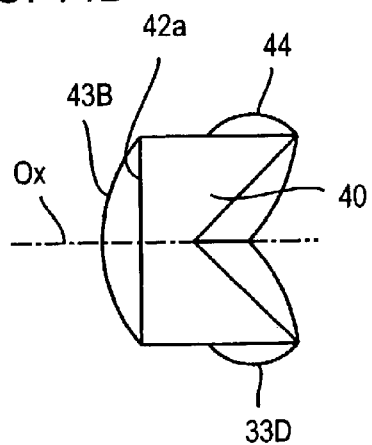
FIG. 14B is its side view.
Figure 14C:
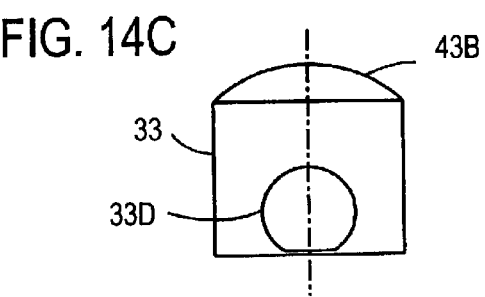
FIG. 14C is its bottom view.

FIG. 14 depicts a structurally simplified version of the optical part 30 of FIG. 11. The two convergent lenses 43 and 33B on the surface 42a of the prism 40 in the FIG. 11 embodiment are replaces with one convergent lens 43B, which comprises symmetrical lens halves one of which forms the received light path and the other of which forms the transmitting light path.

Such a configuration allows ease in manufacturing the optical part and facilitates its assembling with the light emitting element and the light receiving element since no particular limitations are imposed on the positions of their placement.

Figure 15:
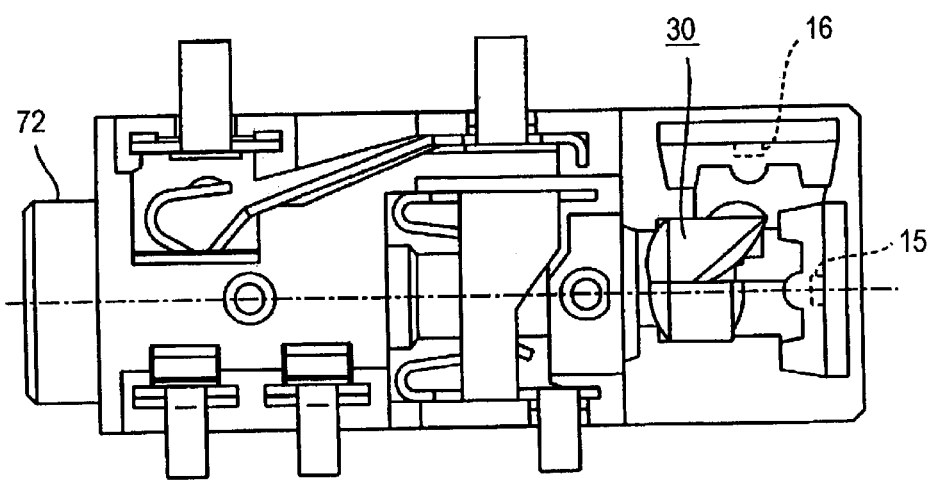
FIG. 15 is a bottom view showing how the optical part of FIG. 9 is incorporated in an optical fiber connector.

FIG. 15 schematically shows, by way of example, how the optical part of the present invention is built in a single-conductor optical fiber connector 71 for photoelectric conversion. In this example the optical part 30 of FIG. 9 embodiment is incorporated in the connector. Reference numeral 72 denotes a sleeve for receiving an optical fiber plug.

As depicted in FIG. 15, the optical part 30 is small0sized, and hence it is suitable for incorporation in such an optical fiber connector 71.

In the optical part of the construction in which the optical guide dedicated for transmission is partly buried in the receiving-side part, the formation of a micro clearance, for instance, between the transmitting- and receiving-side portions, instead of increasing the refractive index of the optical guide, also produces the same effects as described above.

EFFECT OF THE INVENTION

As described above, according to the present invention, since the transmitting light path and the received light path are separated from each other so that the transmitting light can be emitted without leakage to the receiving-side portion, the occurrence of crosstalk can be reduced; accordingly, it is possible to obtain a high-efficiency, high-performance optical part for two-way optical communications.

Furthermore, unlike the prior art example of FIG. 16 which uses two lenses separately of a prism to form separate diverging and converging portions, the optical part of the present invention is formed in a one-piece structure, and hence is small and low-cost.

What is claimed is:

1. An optical part for use in two-way optical communication which performs transmission and reception of light over a single optical fiber, comprising:

converging means for converging received light from said optical fiber onto a light receiving element, said converging means having a lens half for receiving light from an end face of said optical fiber and a cut-out face in a plane parallel to an optical axis thereof;

optical guide means for launching transmitting light from a light emitting element into said optical fiber, said optical guide means having a transmitting prism formed integrally with said converging means on the cut-out face;

wherein said converging means and said optical guide means are disposed adjacent each other so that a surface region of said optical guide means dedicated for emitting said transmitting light from said optical guide means to said optical fiber is adjacent a surface region of said converging means dedicated for receiving light from the optical fiber by said converging means; and wherein said transmitting prism has a first surface which is opposite a face joined to said cut-out face and on which said transmitting light is incident, a second surface opposing the end face of said optical fiber and a third surface for reflecting said transmitting light incident thereon from said first surface toward said second surface.

2. The optical part of claim 1, wherein said converging means includes a box-shaped block integrally formed with the received light emitting surface and a convergent lens formed integrally with the surface of said box-shaped block on the opposite side from said lens half.

3. The optical part of claim 1 or 2, wherein convergent lenses are integrally formed with said first and second surfaces of said transmitting prism, respectively.

4. The optical part of claim 1 or 2, wherein said third surface is concavely curved.

5. The optical part of claim 1, wherein said converging means comprises a receiving prism formed integrally with the light emitting surface of said lens half and formed integrally with said transmitting prism, and a receiving convergent lens for converging light from said receiving prism onto said light receiving element; and wherein said receiving prism has said second surface opposite said optical fiber end face, a fourth surface adjoining said second surface and opposite said light receiving element and a fifth surface for reflecting light incident from said second surface to said fourth surface, said transmitting prism and said receiving prism being integrally formed as one-piece prism of pentagonal section, said lens half and said receiving convergent lens being formed integrally with said second and fourth surfaces, respectively.

6. The optical part of claim 5, wherein convergent lenses for converging said transmitting light are integrally formed with said first and second surfaces, respectively.

7. The optical part of claim 6, wherein said lens half for converging said received light on said second surface and said convergent lens for converging said transmitting light on said second surface are formed by a single lens;

wherein said third and fifth surfaces are both concavely curved; and wherein one half portion of said prism through which said received light passes and the other half through which said transmitting light are formed in symmetrical relation.

8. The optical part of claim 5 or 6, wherein said third and fifth surfaces are concavely curved in said transmitting and receiving prisms, respectively.

* * * * *